(12) United States Patent
Kahn et al.

(10) Patent No.: US 6,490,558 B1
(45) Date of Patent: Dec. 3, 2002

(54) SYSTEM AND METHOD FOR IMPROVING THE ACCURACY OF A SPEECH RECOGNITION PROGRAM THROUGH REPETITIVE TRAINING

(75) Inventors: Jonathan Kahn; Thomas P. Flynn, both of Crown Point, IN (US); Charles Qin, Lake Zurich, IL (US)

(73) Assignee: Custom Speech USA, Inc., Crown Point, IN (US)

( * ) Notice: Subject to any disclaimer, the term of this patent is extended or adjusted under 35 U.S.C. 154(b) by 0 days.

(21) Appl. No.: 09/362,255

(22) Filed: Jul. 28, 1999

(51) Int. Cl.[7] .................. G10L 15/26; G10L 15/04; G10L 15/28; G10L 13/08

(52) U.S. Cl. ................. 704/235; 704/231; 704/251; 704/255; 704/260

(58) Field of Search ................. 704/275, 235, 704/231, 251, 255, 260

(56) References Cited

U.S. PATENT DOCUMENTS 5,960,447 A * 9/1999 Holt et al. ............ 704/235
6,064,957 A * 5/2000 Brandow et al. ........ 704/235
6,195,635 B1 * 2/2001 Wright ................ 704/275

OTHER PUBLICATIONS

Dragon (DragonDictate User's Guide, ©1986–1996 Dragon Systems, Inc.)*

* cited by examiner

Primary Examiner—Richemond Dorvil
Assistant Examiner—Daniel Nolan
(74) Attorney, Agent, or Firm—Sonnenchein Nath & Rosenthal

(57) ABSTRACT

A system and method for quickly improving the accuracy of a speech recognition program. The system is based on a speech recognition program that automatically converts a pre-recorded audio file into a written text. The system parses the written text into segments, each of which is corrected by the system and saved in an individually retrievable manner in association with the computer. The standard speech files are saved towards improving accuracy in speech-to-text conversion by the speech recognition program. The system further includes facilities to repetitively establish an independent instance of the written text from the prerecorded audio file using the speech recognition program. This independent instance can then be broken into segments and each segment in said independent instance replaced with an individually retrievable saved corrected segment associated with that segment. In this manner, repetitive instruction of a speech recognition program can be facilitated.

7 Claims, 3 Drawing Sheets

SYSTEM AND METHOD FOR IMPROVING THE ACCURACY OF A SPEECH RECOGNITION PROGRAM THROUGH REPETITIVE TRAINING

BACKGROUND OF THE INVENTION

1. Field of the Invention

The present invention relates in general to computer speech recognition systems and, in particular, to a system and method for expediting the aural training of an automated speech recognition program.

2. Background Art

Speech recognition programs are well known in the art. While these programs are ultimately useful in automatically converting speech into text, many users are dissuaded from using these programs because they require each user to spend a significant amount of time training the system. Usually this training begins by having each user read a series of pre-selected materials for approximately 20 minutes. Then, as the user continues to use the program, as words are improperly transcribed the user is expected to stop and train the program as to the intended word thus advancing the ultimate accuracy of the acoustic model. Unfortunately, most professionals (doctors, dentists, veterinarians, lawyers) and business executive are unwilling to spend the time developing the necessary acoustic model to truly benefit from the automated transcription.

Accordingly, it is an object of the present invention to provide a system that offers expedited training of speech recognition programs. It is an associated object to provide a simplified means for providing verbatim text files for training the aural parameters (i.e. speech files, acoustic model and/or language model) of a speech recognition portion of the system. These and other objects will be apparent to those of ordinary skill in the art having the present drawings, specification and claims before them.

SUMMARY OF THE INVENTION

The present invention relates to a system for improving the accuracy of a speech recognition program. The system includes means for automatically converting a pre-recorded audio file into a written text. Means for parsing the written text into segments and for correcting each and every segment of the; written text. In a preferred embodiment, a human speech trainer is presented with the text and associated audio for each and every segment. Whether the human speech trainer ultimately modifies a segment or not, each segment (after an opportunity for correction, if necessary) is stored in an individually retrievable manner in association with the computer. The system further includes means for saving speech files associated with a substantially corrected written text and used by the speech recognition program towards improving accuracy in speech-to-text conversion.

The system finally includes means for repetitively establishing an independent instance of the written text from the pre-recorded audio file using the speech recognition program and for replacing each segment in the independent instance of the written text with the individually retrievable saved corrected segment associated therewith.

In one embodiment, the correcting means further includes means for highlighting likely errors in the written text. In such an embodiment, where the written text is at least temporarily synchronized to said pre-recorded audio file, the highlighting means further includes means for sequentially comparing a copy of the written text with a second written text resulting in a sequential list of unmatched words culled from the written text and means for incrementally searching for the current unmatched word contemporaneously within a first buffer associated with the speech recognition program containing the written text and a second buffer associated with a sequential list of possible errors. Such element further includes means for correcting the current unmatched word in the second buffer. In one embodiment, the correcting means includes means for displaying the current unmatched word in a manner substantially visually isolated from other text in the written text and means for playing a portion of said synchronized voice dictation recording from said first buffer associated with said current unmatched word.

The invention further involves a method for improving the accuracy of a speech recognition program operating on a computer comprising: (a) automatically converting a pre-recorded audio file into a written text; (b) parsing the written text into segments; (c) correcting each and every segment of the written text; (d) saving the corrected segment in an individually retrievable manner; (e) saving speech files associated with a substantially corrected written text and used by the speech recognition program towards improving accuracy in speech-to-text conversion by the speech recognition program; (f) establishing an independent instance of the written text from the pre-recorded audio file using the speech recognition program; (g) replacing each segment in the independent instance of the written text with the individually retrievable saved corrected segment associated therewith; (h) saving speech files associated with the independent instance of the written text used by the speech recognition program towards improving accuracy in speech-to-text conversion by the speech recognition program; and (i) repeating steps (f) through (i) a predetermined number of times.

BEST MODES OF PRACTICING THE INVENTION

Figure 1:
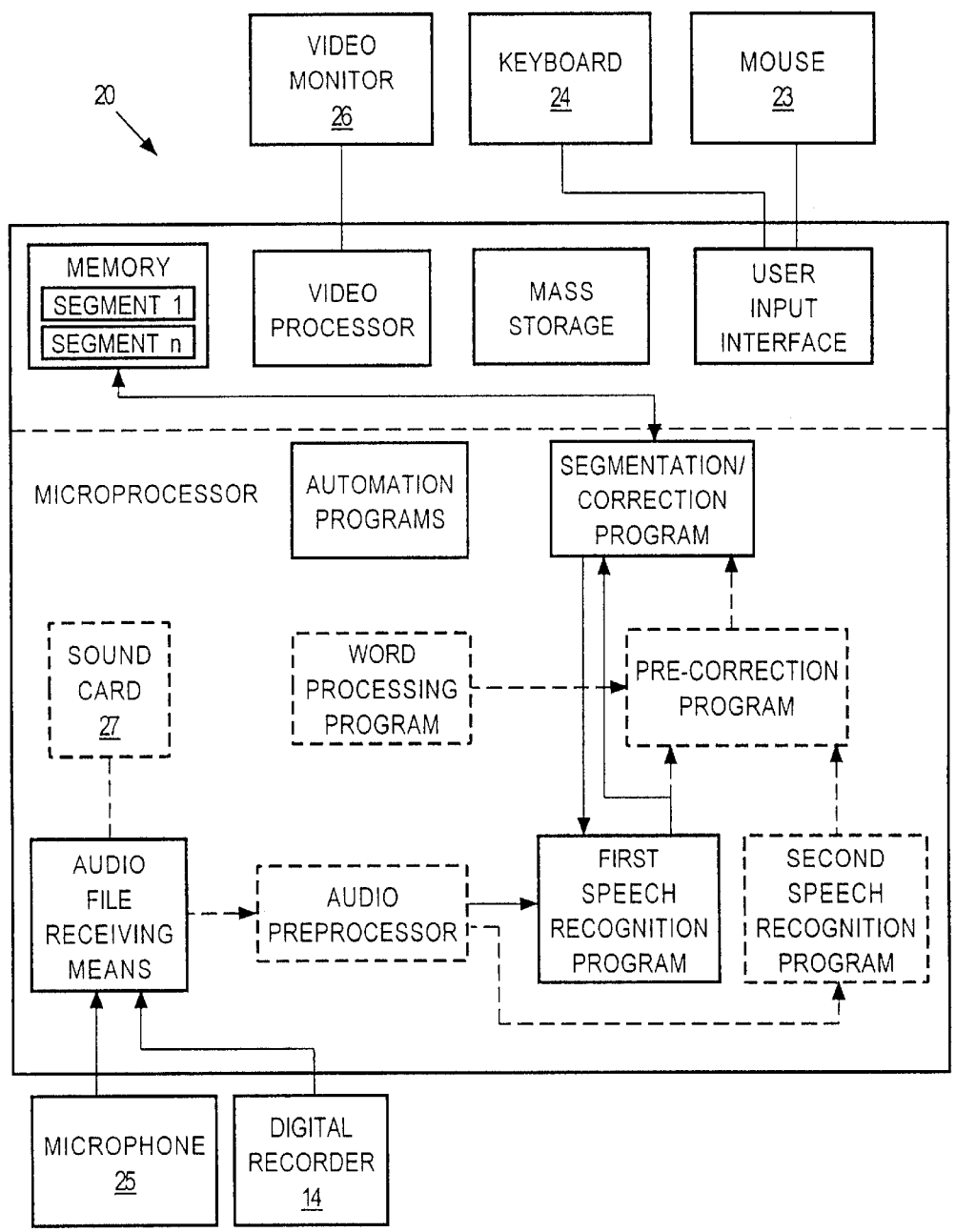
FIG. 1 of the drawings is a block diagram of the system for quickly improving the accuracy of a speech recognition program.
Figure 2:
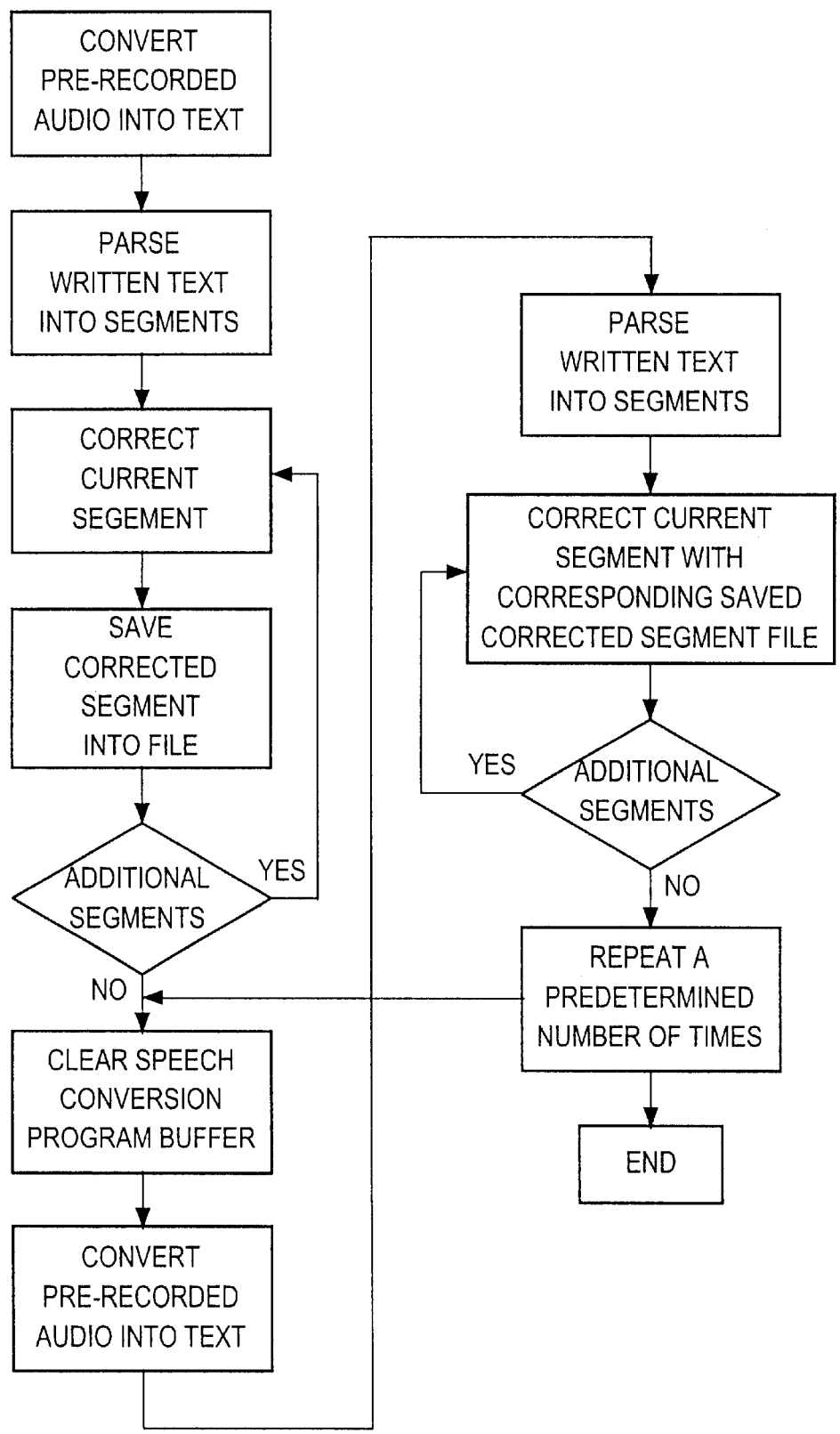
FIG. 2 of the drawings is a flow diagram the method for quickly improving the accuracy of a speech recognition program.

While the present invention may be embodied in many different forms, there is shown in the drawings and discussed herein a few specific embodiments with the understanding that the present disclosure is to be considered only as an exemplification of the principles of the invention and is not intended to limit the invention to the embodiments illustrated.

FIG. 1 of the drawings generally shows one potential embodiment of the present system quickly improving the accuracy of a speech recognition program. The system must include some means for receiving a pre-recorded audio file. This audio file receiving means can be a digital audio recorder, an analog audio recorder, or standard means for receiving computer files on magnetic media or via a data connection; preferably implemented on a general-purpose computer (such as computer 20), although a specialized computer could be developed for this specific purpose.

The general-purpose computer should have, among other elements, a microprocessor (such as the Intel Corporation PENTIUM, AMD K6 or Motorola 68000 series); volatile and non-volatile memory; one or more mass storage devices (i.e. HDD, floppy drive, and other removable media devices such as a CD-ROM drive, DITTO, ZIP or JAZ drive (from Iomega Corporation) and the like); various user input devices, such as a mouse 23, a keyboard 24, or a microphone 25; and a video display system 26. In one embodiment, the general-purpose computer is controlled by the WINDOWS 9.x operating system. It is contemplated, however, that the present system would work equally well using a MACINTOSH computer or even another operating system such as a WINDOWS CE, UNIX or a JAVA based operating system, to name a few. In any embodiment, the general purpose computer has amongst its programs a speech recognition program, such as DRAGON NATURALLY SPEAKING, IBM's VIA VOICE, LERNOUT & HAUSPIE'S PROFESSIONAL EDITION or other programs.

Regardless of the particular computer platform used, in an embodiment utilizing an analog audio input (such as via microphone 25) the general-purpose computer must include a soundcard (not shown). Of course, in an embodiment with a digital input no sound card would be necessary to input the file. However, a sound card is likely to be necessary for playback such that the human speech trainer can listen to the pre-recorded audio file for modifying the written text into a verbatim text.

In one embodiment, the general purpose computer may be loaded and configured to run digital audio recording software (such as the media utility in the WINDOWS 9.x operating system, VOICEDOC from The Programmers' Consortium, Inc. of Oakton, Va., COOL EDIT by Syntrillium Corporation of Phoenix, Ariz. or DRAGON NATURALLY SPEAKING PROFESSIONAL EDITION by Dragon Systems Corporation. In another embodiment, the speech recognition program may create a digital audio file as a byproduct of the automated transcription process. These various software programs produce a pre-recorded audio file in the form of a "WAV" file. However, as would be known to those skilled in the art, other audio file formats, such as MP3 or DSS, could also be used as a format for the audio file, without departing from the spirit of the present invention. The method of saving such audio files is well known to those of ordinary skill in the art.

Another means for receiving a pre-recorded audio file is dedicated digital recorder 14, such as the Olympus Digital Voice Recorder D-1000 manufactured by the Olympus Corporation. Thus, if a user is more comfortable with a more conventional type of dictation device, they can use a dedicated digital recorder in combination with this system. In order to harvest the digital audio text file, upon completion of a recording, a dedicated digital recorder would be operably connected toward downloading the digital audio file into that general-purpose computer. With this approach, for instance, no audio card would be required.

Another alternative for receiving the pre-recorded audio file may consist of using one form or another of removable magnetic media containing a pre-recorded audio file. With this alternative an operator would input the removable magnetic media into the general-purpose computer toward uploading the audio file into the system.

In some cases it may be necessary to pre-process the audio files to make them acceptable for processing by the speech recognition software. For instance, a DSS file format may have to be changed to a WAV file format, or the sampling rate of a digital audio file may have to be upsampled or downsampled. Software to accomplish such pre-processing is available from a variety of sources including Syntrillium Corporation and Olympus Corporation.

In some manner, an acceptably formatted pre-recorded audio file is provided to a first speech recognition program that produces a first written text therefrom. The first speech recognition program may also be selected from various commercially available programs, such as NATURALLY SPEAKING from Dragon Systems of Newton, Mass., VIA VOICE from IBM Corporation of Armonk, N.Y., or SPEECH MAGIC from Philips Corporation of Atlanta, Ga. is preferably implemented on a general-purpose computer, which may be the same general-purpose computer used to implement the pre-recorded audio file receiving means. In DRAGON SYSTEMS' NATURALLY SPEAKING, for instance, there is built-in functionality that allows speech-to-text conversion of pre-recorded digital audio. In a preferred embodiment, NATURALLY SPEAKING has been used by running an executable program or simultaneously with NATURALLY SPEAKING that feeds phantom keystrokes and mouse operations through the WIN32API, such that NATURALLY SPEAKING believes that it is interacting with a human being, when in fact it is being controlled by the microprocessor. Such techniques are well known in the computer software testing art and, thus, will not be discussed in detail. It should suffice to say that by watching the application flow of any speech recognition program, an executable program or macro to mimic the interactive manual steps can be created.

In an embodiment using IBM VIA VOICE—which does not have built-in functionality to allow speech-to-text conversion of pre-recorded audio—a sound card would be configured to "trick" IBM VIA VOICE into thinking that it is receiving audio input from a microphone or in-line when the audio is actually coming from a pre-recorded audio file. Such routing can be achieved, for instance, with a SOUNDBLASTER LIVE sound card from Creative Labs of Milpitas, Calif.

In a preferred embodiment, the transcription errors in the first written text are located in some manner to facilitate establishment of a verbatim text for use in training the speech recognition program. In one approach, a human transcriptionist establishes a transcribed file, which can be automatically compared with the first written text creating a list of differences between the two texts, which is used to identify potential errors in the first written text to assist a human speech trainer in locating such potential errors to correct same. Such effort could be assisted by the use of specialized software for isolating or highlighting the errors and synchronizing them with their associated audio.

In another approach for establishing a verbatim text, the acceptably formatted pre-recorded audio file is also provided to a second speech recognition program that produces a second written text therefrom. The second speech recognition program has at least one "conversion variable" different from the first speech recognition program. Such "conversion variables" may include one or more of the following:

(1) speech recognition programs (e.g. DRAGON SYSTEMS' NATURALLY SPEAKING, IBM's VIA VOICE or Philips Corporation's MAGIC SPEECH);

(2) language models within a particular speech recognition program (e.g. general English versus a specialized vocabulary (e.g. medical, legal));

(3) settings within a particular speech recognition program (e.g. "most accurate" versus "speed"); and/or (4) the pre-recorded audio file by pre-processing same with a digital signal processor (such as COOL EDIT by Syntrillium Corporation of Phoenix, Ariz. or a programmed DSP56000 IC from Motorola, Inc.) by changing the digital word size, sampling rate, removing particular harmonic ranges and other potential modifications.

By changing one or more of the foregoing "conversion variables" it is believed that the second speech recognition program will produce a slightly different written text than the first speech recognition program and that by comparing the two resulting written texts a list of differences between the two texts to assist a human speech trainer in locating such potential errors to correct same. Such effort could be assisted by the use of specialized software for isolating or highlighting the errors and synchronizing them with their associated audio.

In a preferred embodiment, the first written text created by the first speech recognition program based upon the pre-recorded audio file is not pre-corrected, but rather is fed directly into a segmentation/correction program. The segmentation/correction program utilizes the speech recognition program's parsing system to sequentially identify speech segments toward placing each and every one of those speech segments into a correction window—whether correction is required on any portion of those segments or not. A speech trainer plays the synchronized audio associated with the currently displayed speech segment using a "playback" button in the correction window and manually compares the audible text with the speech segment in the correction window. If one of the pre-correction approaches disclosed above is used then less corrections should be required at this stage. However, if correction is necessary, then that correction is manually input with standard computer techniques (using the keyboard, mouse and/or speech recognition software and potentially lists of potential replacement words).

Sometimes the audio is unintelligible or unusable (e.g., dictator sneezes and speech recognition software types out a word, like "cyst"—an actual example). Sometimes the speech recognition program inserts word(s) when there is no detectable audio. Or sometimes when the dictator says a command like "New Paragraph" it types in the words "new" and "paragraph". One approach where there is noise or no sound, is to type in some nonsense word like "xxxxx" for the utterance file so that audio text alignment is not lost. In cases, where the speaker pauses and the system types out "new" and "paragraph," the words "new" and "paragraph" will have to be treated as text (and not as command). Although it is also possible to train commands to some extent by replacing, such an error with the voice macro command (e.g. "New-Paragraph"). Thus, it is contemplated that correction techniques may be modified to take into account the limitations and errors of the underlying speech recognition software to promote improved automated training of speech files.

In another potential embodiment, unintelligible or unusable portions of the pre-recorded audio file may be removed using an audio file editor, so that only the usable audio would be used for training the speech recognition program.

Once the speech trainer believes the segment is a verbatim representation of the synchronized audio, the segment is manually accepted and the next segment automatically displayed in the correction window. Once accepted, the corrected/verbatim segment from the correction window is pasted back into the first written text and is additionally saved into the next sequentially numbered "correct segment" file. Accordingly, by the end of a document review there will be a series of separate computer files containing the verbatim text, numbered sequentially, one for each speech segment in the currently first written text.

In Dragon's NATURALLY SPEAKING these speech segments vary from 1 to possibly 20 words depending upon the length of the pause setting in the Miscellaneous Tools section of NATURALLY SPEAKING. If you make the pause setting long, more words will be part of the utterance because a long pause is required before NATURALLY SPEAKING establishes a different utterance. If it the pause setting is made short, then there are more utterances with few words. In VIA VOICE, the size of these speech segments is similarly adjustable, but apparently based on the number of words desired per segment (e.g. 10 words per segment).

Figure 3:
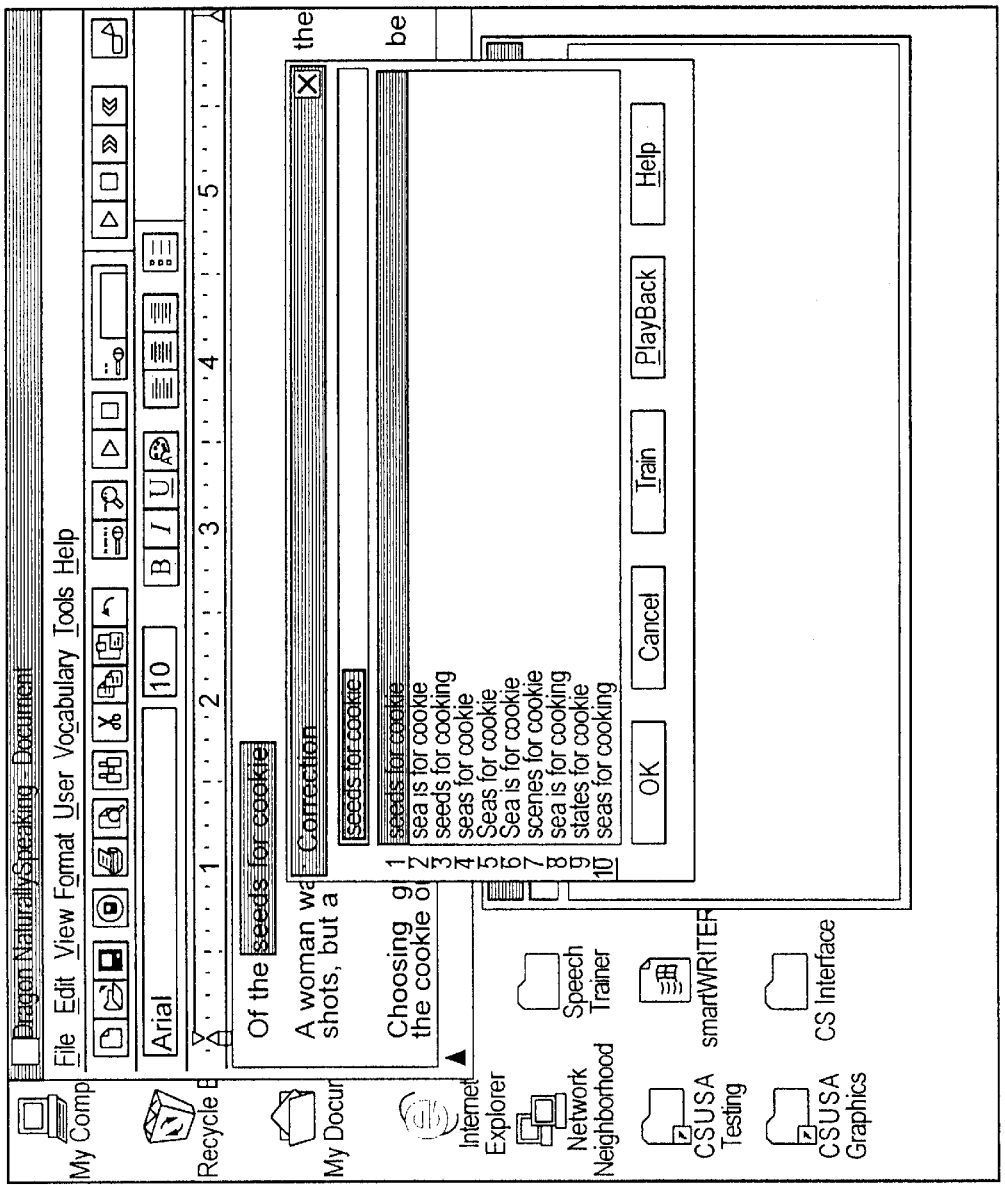
FIG. 3 of the drawings is a plan view of the present system and method in operation in conjunction with DRAGON NATURALLY SPEAKING software.

One potential user interface having the minimal functionality desired to implement the segmentation/correction scheme is shown in FIG. 3. In the depicted embodiment, the Dragon NATURALLY SPEAKING program has selected "seeds for cookie" as the current speech segment (or utterance in Dragon parlance). The human speech trainer listening to the portion of pre-recorded audio file associated with the currently displayed speech segment, looking at the correction window and perhaps the speech segment in context within the transcribed text determines whether or not correction is necessary. By clicking on "Play Back" the audio synchronized to the particular speech segment is automatically played back. Once the human speech trainer knows the actually dictated language for that speech segment, they either indicate that the present text is correct (by merely pressing an "OK" button) or manually replace any incorrect text with verbatim text. In either event, the corrected/verbatim text from the correction window is pasted back into the first written text and is additionally saved into the next sequentially numbered correct segment file.

Once the verbatim text is completed (and preferably verified for accuracy), the series of sequentially numbered files containing the text segments are used to train the speech recognition program. First, video and storage buffer of the speech recognition program are cleared. Next, the pre-recorded audio file is loaded into the first speech recognition program, in the same manner disclosed above. Third, a new written text is established by the first speech recognition program. Fourth, the segmentation/correction program utilizes the speech recognition program's parsing system to sequentially identify speech segments and places each and every one of those speech segments into a correction window (see FIG. 3)—whether correction is required on any portion of that segment or not—seriatim. Fifth, the system automatically replaces the text in the correction window (e.g. "seeds for cookie") with he next sequentially numbered "correct segment" file created by the system in the prior stage using standard operating system pasting from a clipboard functionality. The text that remains in the correction window is then pasted into the underlying Dragon NATURALLY SPEAKING buffer by activating the "OK" button in the "Correction" dialog box (whether or not the original was correct) and the segment counter is advanced. The fourth and fifth steps are repeated until all of the segments have been replaced.

By automating this five-step process, the present system can produce a significant improvement in the accuracy of the speech recognition program. Such automation would take the form of an executable simultaneously operating with the speech recognition means that feeds phantom keystrokes and mouse operations through the WIN32API, such that the first speech recognition program believes that it is interacting with a human being, when in fact it is being controlled by the microprocessor. Such techniques are well known in the computer software testing art and, thus, will not be discussed in detail. It should suffice to say that by watching the application flow of any speech recognition program, an executable to mimic the interactive manual steps can be created. This process is also automated to repeat a predetermined number of times.

This selection and replacement of every text segment within the buffer leads to an improvement in the aural parameters of the speech recognition program for the particular speech user that recorded the pre-recorded audio file. In this manner, the accuracy of first speech recognition program's speech-to-text conversion can be markedly, yet quickly improved.

In the above method it is alternatively possible to select and replace only the erroneous segments. However, this approach creates potentially unnecessary complications in designing the actual program to implement the system.

The foregoing description and drawings merely explain and illustrate the invention and the invention is not limited thereto. Those of the skill in the art who have the disclosure before them will be able to make modifications and variations therein without departing from the scope of the present invention. For instance, it is possible to implement all of the elements of the present system on a single general-purpose computer by essentially time sharing the machine between the voice user, speech trainer and the speech recognition program(s). The resulting cost saving makes this system accessible to more types of office situations not simply large medical clinics, hospital, law firms or other large entities.

What is claimed is:

1. A system for improving the accuracy of a speech recognition program operating on a computer, said system comprising:
   means for automatically converting a pre-recorded audio file into a written text;
   means for parsing said written text into segments;
   means for correcting each and every segment of said written text;
   means for saving said corrected segment in an individually retrievable manner in association with said computer;
   means for saving speech files associated with a substantially corrected written text and used by said speech recognition program towards improving accuracy in speech-to-text conversion by said speech recognition program; and
   means for repetitively establishing an independent instance of said written text from said pre-recorded audio file using said speech recognition program and for automatically replacing each segment in said independent instance of said written text with said individually retrievable saved corrected segment associated therewith.

2. The invention according to claim 1 wherein said correcting means further includes means for highlighting likely errors in said written text.

3. The invention according to claim 2 wherein said written text is at least temporarily synchronized to said pre-recorded audio file, said highlighting means comprises:
   means for sequentially comparing a copy of said written text with a second written text resulting in a sequential list of unmatched words culled from said copy of said written text, said sequential list having a beginning, an end and a current unmatched word, said current unmatched word pointer being successively advanced from said beginning to said end;
   means for incrementally searching for said current unmatched word contemporaneously within a first buffer associated with the speech recognition program containing said written text and a second buffer associated with said sequential list; and
   means for correcting said current unmatched word in said second buffer, said correcting means including means for displaying said current unmatched word in a manner substantially visually isolated from other text in said copy of said written text and means for playing a portion of said synchronized voice dictation recording from said first buffer associated with said current unmatched word.

4. The invention according to claim 3 wherein said second written text is established by a second speech recognition program having at least one conversion variable different from said speech recognition program.

5. The invention according to claim 3 wherein said second written text is established by one or more human beings.

6. The invention according to claim 3 wherein said correcting means further includes means for alternatively viewing said current unmatched word in context within said copy of said written text.

7. A method for improving the accuracy of a speech recognition program operating on a computer comprising:
   (a) automatically converting a pre-recorded audio file into a written text;
   (b) parsing the written text into segments;
   (c) correcting each and every segment of the written text;
   (d) saving the corrected segment in an individually retrievable manner;
   (e) saving speech files associated with a substantially corrected written text and used by the speech recognition program towards improving accuracy in speech-to-text conversion by the speech recognition program;
   (f) establishing an independent instance of the written text from the pre-recorded audio file using the speech recognition program;
   (g) automatically replacing each segment in the independent instance of the written text with the individually retrievable saved corrected segment associated therewith;
   (h) saving speech files associated with the independent instance of the written text used by the speech recognition program towards improving accuracy in speech-to-text conversion by the speech recognition program; and
   (i) repeating steps (f) through (i) a predetermined number of times.

* * * * *